United States Patent Office 3,477,687
Patented Nov. 11, 1969

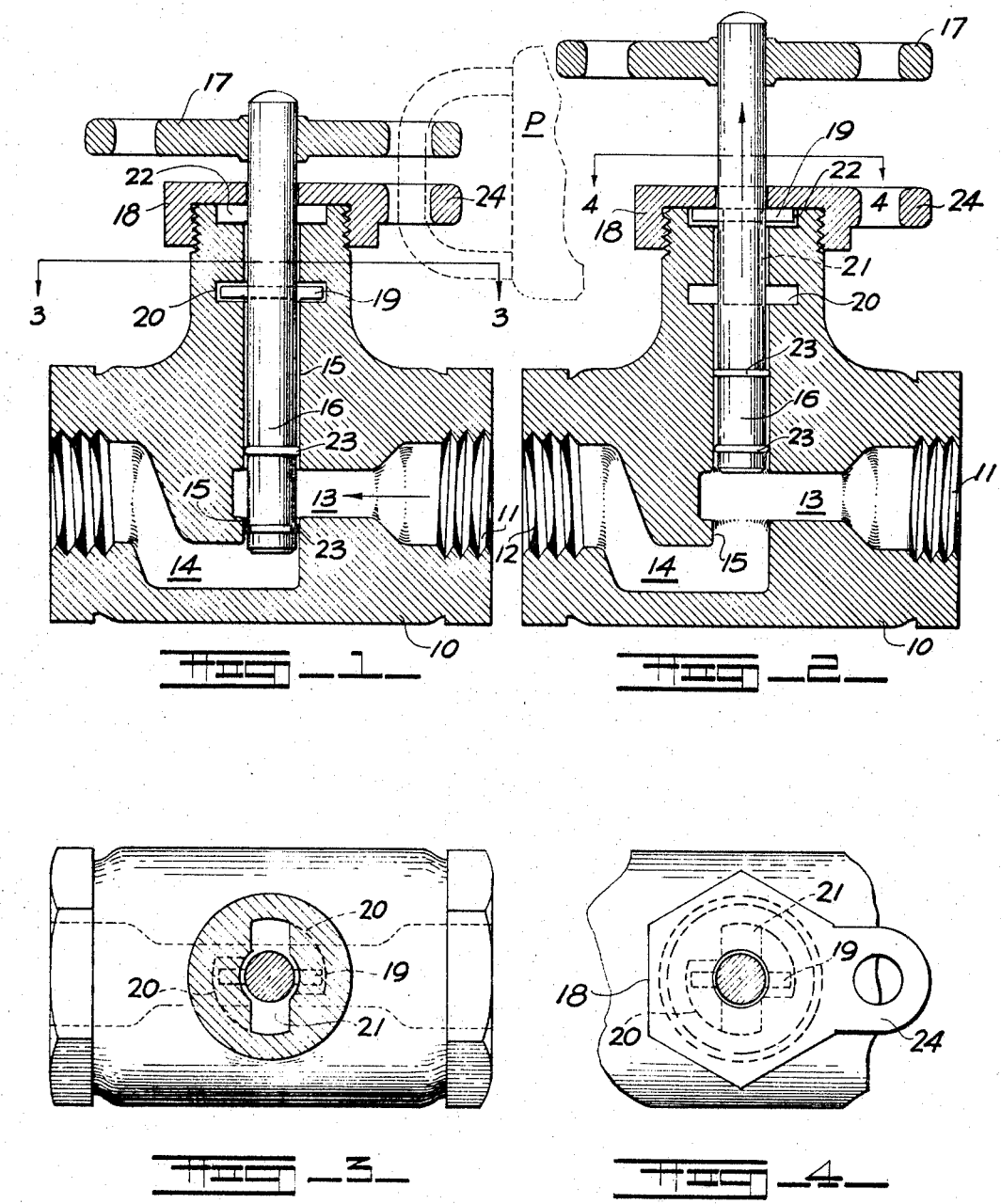

3,477,687
VALVE
Kingsley A. Doutt, 115 Maple St., Alpena, Mich. 49707
Filed Oct. 3, 1967, Ser. No. 672,579
Int. Cl. F16k *1/08, 15/18*
U.S. Cl. 251—100                                    1 Claim

ABSTRACT OF THE DISCLOSURE

A valve for controlling low pressure fluids including inlet and outlet orifices having a communicating passageway including a cylindrical chamber and a valve element in the form of a plunger having O rings in spaced relation thereon movably positioned in said cylindrical chamber, so as to block or open said passageway depending on the position of said plunger.

---

This invention relates to a valve, and more particularly to a low pressure air or water valve of simple economical construction. The principal object of the invention is the provision of a simple, low cost, low pressure fluid control valve that utilizes a plunger movable axially within the body of the valve so as to control a fluid passageway or passageways extending therethrough.

A still further object of the invention is the provision of a low cost, low pressure air or water valve having a valve element in the form of a plunger movable relative to said valve for opening and closing a fluid passageway therethrough, the plunger having means for containing it within predetermined limits in said valve.

A still further object of the invention is the provision of a low cost, low pressure air or water valve including a valve body having a transversely extending fluid passageway with a right angular bore communicating with said passageway and forming a portion thereof, and a rod-like plunger movable in said bore into and out of said passageway and means on said rod for sealing it in relation to said valve.

The low pressure air or water valve shown herein comprises a simple and efficient, easily formed and inexpensive valve for controlling water or gas lines and the like such as used in dwelling houses, etc. The valves heretofore known in the art have included specific valve seats and valve elements registrable with said seats for controlling the flow of air or water through a passageway in which said valve seat is located. In the present valve no such construction is necessary, and the difficulty of forming it and machining the parts in close tolerance is avoided. In the present inventon a simple valve body is provided with a bore formed at right angles to a fluid passageway therethrough, with a portion of the fluid passageway following a portion of said bore. A plunger having O rings mounted in grooves therein in spaced relation, is mounted in said bore for movement axially of the bore so that the plunger may be moved into a position where it blocks the passageway or alternately, into position where it opens the passageway. Means on said plunger registers with said valve and prevents the plunger from moving completely out of said bore.

With the foregoing and other objects in view which will appear as the description proceeds, the invention resides in the combinaton and arrangement of parts and in the details of construction hereinafter described and claimed.

The invention is illustrated in the accompanying drawing, wherein:

FIGURE 1 is a vertical section through a valve showing the valve plunger in closed position.

FIGURE 2 is a vertical section through a valve showing the valve plunger in open position.

FIGURE 3 is a horizontal section on line 3—3 of FIGURE 1, and

FIGURE 4 is a horizontal section on line 4—4 of FIGURE 2.

By referring to the drawing, and FIGURE 1 in particular, it will be seen that the valve comprises a body member 10, having an inlet opening 11 on one side and an outlet opening 12 on the other side, with passageways 13 and 14 respectively communicating with said inlet and outlet openings, and with a right angularly disposed bore 15 which extends into the valve body 10 from an upper end thereof. The passageways 13 and 14 are so arranged that the passageway 13 communicates with one side of the bore 15, while the passageway 14 communicates with one end of the bore 15. A plunger 16 is positioned in the bore and extends outwardly through the upper end of the body and exteriorly thereof, where it is provided with a hand wheel 17. The hand wheel 17 is secured to the plunger 16. A cap 18 is threadably engaged upon the upper end of the valve body 10. A pin 19 is positioned transversely of the plunger 16 with its ends extending outwardly thereof and into oppositely disposed recesses 20, which communicate with vertical sections 21, as best seen in FIGURE 3 of the drawing, which in turn communicate with secondary recesses 22 formed in the valve body 10, and more specifically the upper end thereof, and spaced with respect to the recesses 20.

It will thus be observed, by referring to FIGURES 1 and 2 of the drawing and the cross sections of FIGURES 3 and 4 of the drawing, that the plunger 16 can be moved axially of the bore 15 only at such time as it is revolved 90° so as to bring the ends of the transverse pin 19 into the oppositely disposed vertically extending grooves 21. The plunger 16 is then movable vertically within the bore, and when it is moved from the position shown in FIGURE 1 to the position shown in FIGURE 2, it is then revolved a quarter turn, which brings the pin 19 into locking relation with the recesses 22, as hereinbefore described. The axial movement of the plunger 16 is thus controlled by the pin 19 registering in the hereinbefore described configuration formed in the valve body and communicating with the bore 15.

The lower end of the plunger 16 is provided with a pair of longitudinally spaced annular grooves and O rings 23 formed of resilient material are positioned in these annular grooves on the plunger 16 and distorted when the plunger 16 is positioned in the bore 15. Thus, they serve to seal the plunger 16 relative to the valve body 10 regardless of its position within the bore 15.

So that the valve can be secured in either open or closed position, as shown in FIGURES 2 and 1 respectively, an apertured extension 24 is formed on the cap 18 and it may therefore be used in connection with one of the apertures in the hand wheel 17 for the positioning of a padlock such as partially shown in broken lines in FIGURE 1 of the drawing, and indicated by the letter P. Thus, the valve can be locked in the desired position as it is impossible to change the relative position of the plunger 16 unless the stem 16 is rotated 90° as hereinbefore described, and the padlock prevents such rotation.

It will occur to those skilled in the art that several variations of the basic low pressure air and water valve shown herein, are possible and one of these for example, might comprise a speed control valve wherein the recesses 20 and the vertical groove 21 comprised a spiral configuration and the pin controlled the longitudinal positioning of the plunger 16 relative to the bore so that a metering effect would be had with the end of the plunger 16 relative to the bore 15 and its intersection with the passageways 13 and 14.

Still other variations will occur to those skilled in the art, as for example, where a third outlet would communicate with the bottom of the bore 15 and an extension of the plunger 16 arranged to register therewith so that a three-way valve resulted.

It will thus be seen that a valve meeting the objects of the invention has been disclosed and having thus described my invention, what I claim is:

1. A valve for controlling fluids comprising a valve body having an inlet passageway and an outlet passageway, a cylindrical bore of the same diameter throughout extending into said body, one of said passageways intersecting said bore in spaced relation to the inner end thereof over a predetermined distance along the length thereof, a cylindrical plunger mounted in and extending substantially throughout the length of the bore, said plunger being of the same diameter throughout, and slightly less than the diameter of the bore, and mounted for longitudinal movement therein to open and closed positions, said plunger having a first annular groove adjacent its inner end and a second annular groove spaced outwardly of said first annular groove a distance greater than said predetermined distance, O-rings carried in said grooves contacting the walls of said bore, the other of said passageways being laterally extending and intersecting the lower end of said bore, said plunger having a transversely projecting pin adjacent its outer end operating in longitudinally spaced pairs of oppositely disposed recesses in the side walls of said bore to lock said plunger in said open and closed positions respectively.

References Cited

UNITED STATES PATENTS

| 18,091 | 9/1857 | Getty | 251—100 |
| 2,360,733 | 10/1944 | Smith | 251—324 |
| 2,690,322 | 9/1954 | Stansfield | 251—324 |
| 2,916,044 | 12/1959 | Phelan et al. | 251—324 |

FOREIGN PATENTS

| 1,155,487 | 12/1957 | France. |
| 1,213,805 | 11/1959 | France. |

ARNOLD ROSENTHAL, Primary Examiner

U.S. Cl. X.R.

251—324